United States Patent
Mao

Patent Number: 5,923,547
Date of Patent: Jul. 13, 1999

[54] SNUBBER CIRCUIT FOR A POWER CONVERTER AND METHOD OF OPERATION THEREOF

[75] Inventor: Hengchun Mao, Dallas, Tex.

[73] Assignee: Lucent Technologies, Murray Hill, N.J.

[21] Appl. No.: 09/012,131

[22] Filed: Jan. 22, 1998

[51] Int. Cl.$^6$ ............................................... H02M 7/125
[52] U.S. Cl. .............................. 363/52; 363/44; 363/132
[58] Field of Search .................................. 363/39, 40, 44, 363/52, 45, 53, 125, 17, 131, 132

[56] References Cited

U.S. PATENT DOCUMENTS

| | | | |
|---|---|---|---|
| 5,038,267 | 8/1991 | De Doncker et al. | 363/89 |
| 5,184,291 | 2/1993 | Crowe et al. | 363/37 |
| 5,736,842 | 4/1998 | Jovanovic | 323/222 |

*Primary Examiner*—Adolf Deneke Berhane

[57] ABSTRACT

For use with a power converter having a switching circuit coupled to a primary winding of a transformer and a rectifier coupled to a secondary winding of the transformer, the switching circuit exhibiting switching losses and the rectifier inducing reverse recovery currents in the converter, a snubber circuit and a method of reducing the switching losses and reverse recovery currents. In one embodiment, the snubber circuit includes (1) a clamping capacitor coupled to the secondary winding, (2) a first clamping diode coupled to the rectifier that diverts the reverse recovery currents to the clamping capacitor and (3) an auxiliary switch that creates a path to discharge leakage inductance in the transformer to facilitate substantially zero current turn-off of the switching circuit and recover the energy stored in the clamping capacitor to an output of the converter, the auxiliary switch, clamping diode and clamping capacitor cooperating to reduce the switching losses and reverse recovery currents in the converter.

20 Claims, 6 Drawing Sheets

SNUBBER CIRCUIT FOR A POWER CONVERTER AND METHOD OF OPERATION THEREOF

TECHNICAL FIELD OF THE INVENTION

The present invention is directed, in general, to power supplies and, more specifically, to a snubber circuit that reduces switching losses and reverse recovery currents associated with a power converter and a method of operation thereof.

BACKGROUND OF THE INVENTION

A power converter is a power processing circuit that converts an input voltage or current source into a specified output voltage or current. A DC/DC full-bridge phase-shift power converter is a frequently employed switched-mode power converter that converts an input DC voltage to a specified output DC voltage. The DC/DC full-bridge phase-shift power converter generally includes switching circuitry coupled to an input source of electrical power. The switching circuitry includes two pairs of alternately conducting active switches. A primary winding of a transformer is coupled to the switching circuitry and a secondary winding of the transformer is coupled to a rectifier (e.g., rectifying diodes). The rectifier circuit is coupled through an output filter to a load.

DC/DC converters, in general, can experience significant energy losses and voltage oscillations in the rectifier diodes. This problem is amplified when the DC/DC converters are employed in higher power applications. In the past, dissipative snubbers, such as RC snubbers, RCD snubbers or saturable inductors, have been used to suppress the voltage ringing associated with the rectifier diodes. While the dissipative snubbers adequately dampen the voltage oscillations, the dissipative snubbers increase power losses associated with the converter and, in the case of the saturable inductors, the saturable cores generate heat and cause thermal concerns in the converter at high operation temperatures.

Additional losses in switched-mode converters result from switching losses associated with the primary switches in the converter. To minimize the switching losses, transitioning the switches at minimal voltage or current is desirable. Zero-voltage switching can be achieved by employing phase shift control. Zero-current turn-off, however, is desirable in higher power applications since lower-cost and lower-conduction-drop isolated-gate bipolar transistors (IGBTs) may then be employed.

Recently, several topologies have been proposed to reduce the transformer primary current to zero before the resonant leg switches are turned off, aimed at reducing the turn-off losses of the switches. The proposed topologies generally employ a capacitor or an extra winding of the transformer or output choke to provide a discharging voltage to the transformer leakage inductance during a freewheeling mode thereof, thereby forcing the primary current to substantially zero. The proposed topologies, however, do not simultaneously resolve the rectifier reverse recovery condition. See, for instance, *Zero Voltage and Zero Current Switch Full-Bridge PWM Converter for High Power Applications,* by J. G. Cho, et al., pp. 102–108, PSEC 1994, which is incorporated herein by reference. Alternatively, an active snubber with two auxiliary switches has been proposed in A 48V, 1.5 kW, *Front-End Zero-Voltage-Switched PWM Converter with Lossless Active Snubbers for Output Rectifiers,* by D. B. Dalal, et al., pp. 722–728, APEC 1993, which is incorporated herein by reference. While Dalal proposes a circuit to manage and recover the energy associated with the reverse recovery current of the rectifier, it fails to even address the turn-off losses associated with the switching circuitry.

Accordingly, what is needed in the art is a snubber circuit that achieves a substantially zero current turn-off for the resonant leg switches of the converter and further reduces the reverse recovery current of the rectifier over a wide range of power applications.

SUMMARY OF THE INVENTION

To address the above-discussed deficiencies of the prior art, the present invention provides for use with a power converter having a switching circuit coupled to a primary winding of a transformer and a rectifier coupled to a secondary winding of the transformer, the switching circuit exhibiting switching losses and the rectifier inducing reverse recovery currents in the converter, a snubber circuit and a method of reducing the switching losses and reverse recovery currents. In one embodiment, the snubber circuit includes (1) a clamping capacitor coupled to the secondary winding, (2) a first clamping diode coupled to the rectifier that diverts the reverse recovery currents to the clamping capacitor and (3) an auxiliary switch that creates a path to discharge leakage inductance in the transformer to facilitate substantially zero current turn-off of the switching circuit and recover the energy stored in the clamping capacitor to an output of the converter, the auxiliary switch, clamping diode and clamping capacitor cooperating to reduce the switching losses and reverse recovery currents in the converter.

The present invention, therefore, provides a snubber circuit that achieves a substantially zero current turn-off for the primary switches of the converter and further reduces the reverse recovery currents of the rectifier over a wide range of power applications.

In an alternative embodiment of the present invention, the rectifier includes first and second rectifying diodes and the snubber circuit further includes a second clamping diode, the first and second clamping diodes diverting the reverse recovery currents from the first and second rectifying diodes, respectively, to the clamping capacitor. In a related, but alternative embodiment, the secondary winding includes first and second outer taps and a center tap, the first and second rectifying diodes are coupled to the first and second outer taps, respectively, and the output of the converter is coupled to the center tap.

In an alternative embodiment of the present invention, the snubber circuit further includes a freewheeling diode coupled to the clamping capacitor that provides an alternate current path for an output current of the converter. For reasons that will become more apparent, the snubber circuit also manages any reverse recovery currents associated with the freewheeling diode.

In an alternative embodiment of the present invention, the switching circuit includes controllable first, second, third and fourth switches to impress forward currents across the primary winding. Of course, any switching circuit or converter topology is well within the broad scope of the present invention.

In an alternative embodiment of the present invention, the snubber circuit further includes an anti-parallel diode coupled to the auxiliary switch. Those skilled in the art are familiar with anti-parallel diodes and the advantages associated with the snubber circuit of the present invention will be described below.

In an alternative embodiment of the present invention, the converter further includes an output filter circuit. Those skilled in the art are familiar with filter circuits and their respective advantages as applied to converters.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
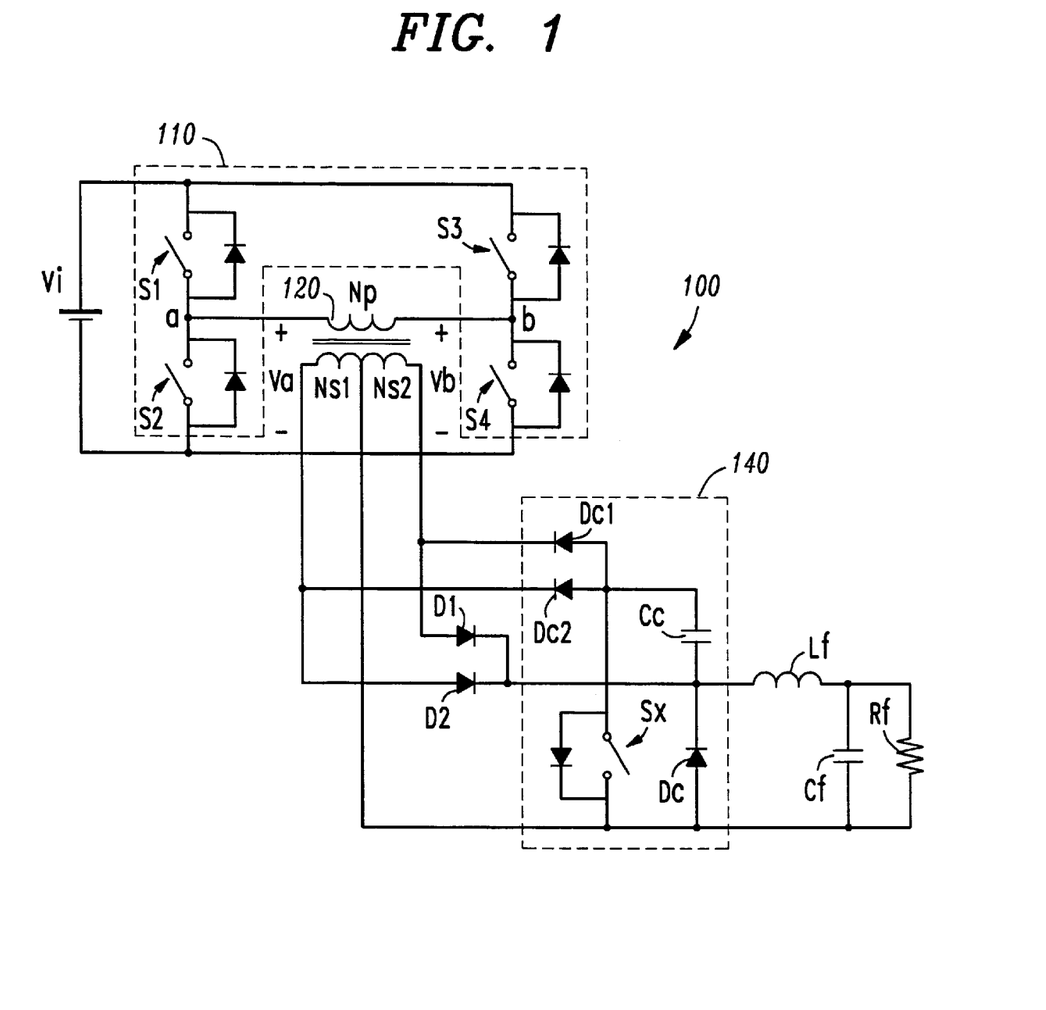
FIG. 1 illustrates a schematic diagram of an embodiment of a power converter constructed according to the principles of the present invention.

Referring initially to FIG. 1, illustrated is a schematic diagram of a power converter (e.g., a full-bridge converter) 100 employing an embodiment of an active snubber circuit 140 constructed according to the principles of the present invention. The converter 100 is coupled to a source of electrical power Vi and includes an isolation transformer 120 having a primary winding Np and first and second secondary windings Ns1, Ns2. The converter 100 further includes switching circuitry 110, consisting of a first, second, third and fourth switch S1, S2, S3, S4, coupling the source of electrical power Vi to the primary winding Np of the isolation transformer 120. Any type of switching device may be employed in the switching circuitry.

The converter 100 further includes a rectifier (e.g., first and second rectifying diodes D1, D2) coupled to the outer taps of the secondary winding Ns1, Ns2 and to an output inductor Lf. The DC output of the converter 100 is derived from the output inductor Lf and the center tap of the secondary windings Ns1, Ns2. An output capacitor Cf (part of an output filter circuit) and a resistive load Rf are coupled in parallel across an output of the converter 100.

The active snubber circuit 140 includes first and second clamping diodes Dc1, Dc2 which are coupled to the outer taps of the secondary windings Ns1, Ns2 and to an auxiliary switch Sx which is further coupled to the center tap of the secondary windings Ns1, Ns2. The auxiliary switch Sx consists of a switching circuit across which is coupled an anti-parallel diode. A clamping capacitor Cc is coupled to the auxiliary switch Sx and the output inductor Lf, and a freewheeling diode Dc is coupled to the clamping capacitor Cc and to the center tap of the transformer's secondary windings Ns1, Ns2. The auxiliary switch Sx may be, in one alternative embodiment, a p-channel MOSFET thereby requiring a less complex low-side driver for control thereof. Of course, the broad scope of the present invention is not limited to the type of switch employed therein.

Turning now to FIGS. 2A–2I, illustrated are voltage and current waveforms of the converter 100 of FIG. 1. More specifically, FIGS. 2A–2D represent gate drive voltage characteristics across the switches S1, S2, S3, S4, respectively. As shown, the switches S1, S2, S3, S4 turn-on and -off at staggered time intervals producing the sought after phase-shift control. FIG. 2E represents a gate drive voltage characteristic across the auxiliary switch Sx. FIG. 2F represents a current characteristic through the primary winding Np of the isolation transformer 120. FIG. 2G represents a current characteristic through the auxiliary switch Sx. FIG. 2H represents a voltage characteristic across the second switch S2. FIG. 2I represents a voltage characteristic across the fourth switch S4.

Figure 2:
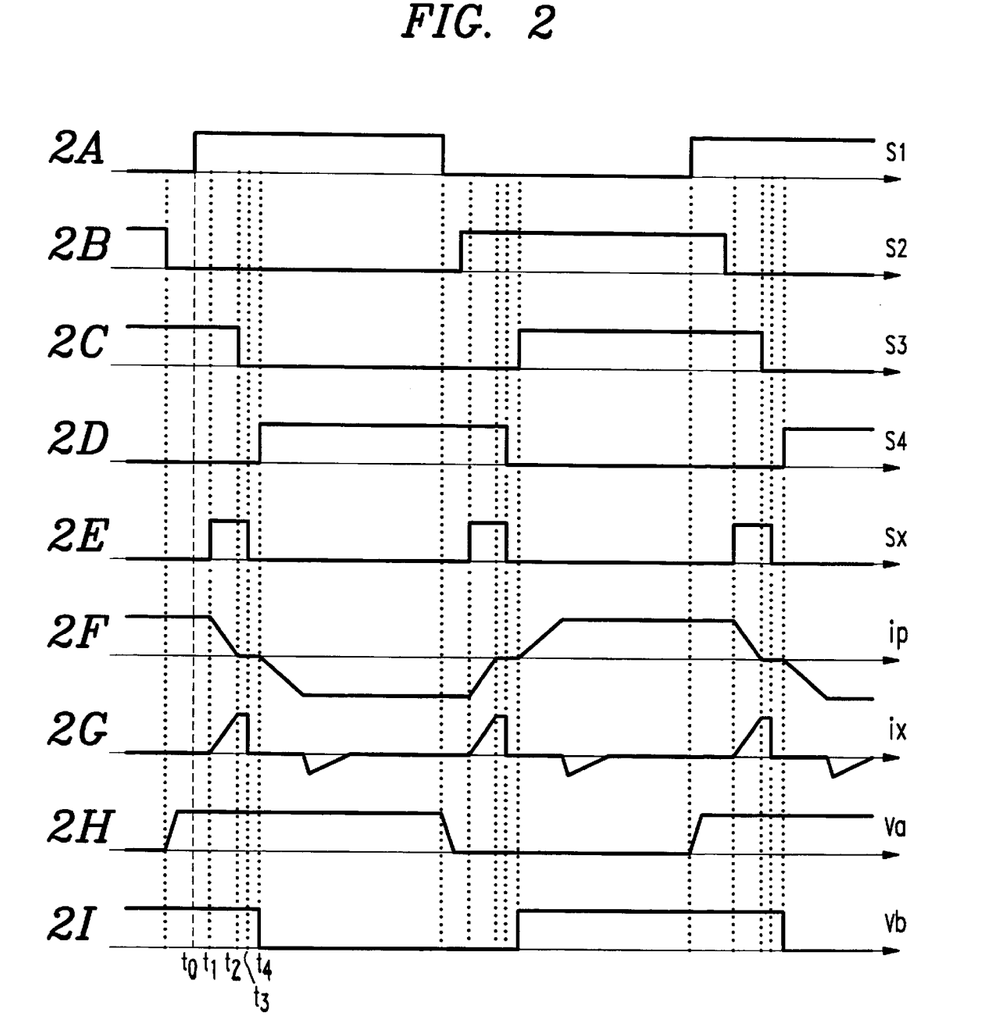
FIGS. 2A–2I illustrate voltage and current waveforms of the converter of FIG. 1.
Figure 3A:
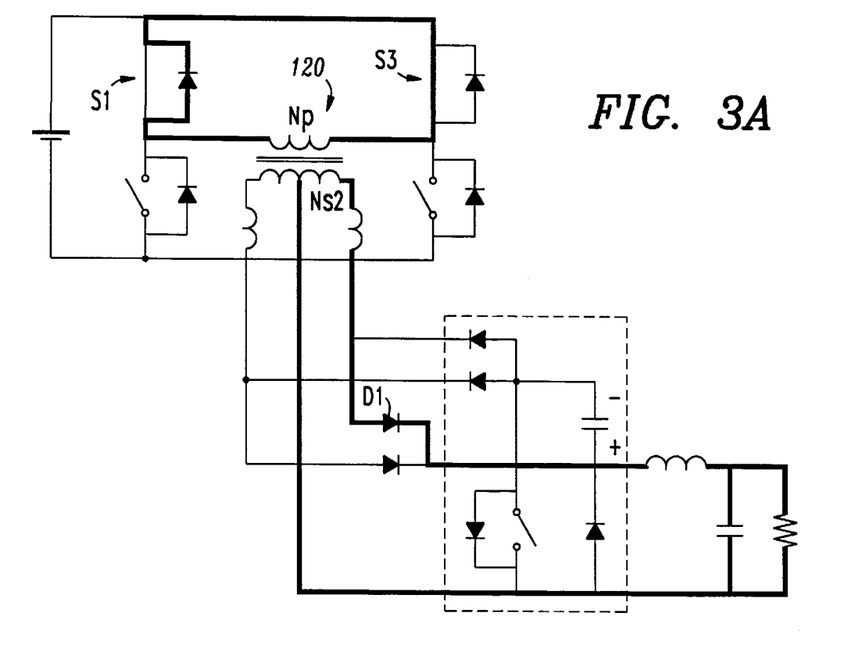
FIGS. 3A–3G illustrate schematic diagrams of the converter of FIG. 1 showing current paths during various operational stages thereof.

Turning now to FIGS. 3A–3G and with continuing reference to FIG. 2, illustrated are schematic diagrams of the converter 100 of FIG. 1 showing current paths, shown as thick darkened lines, during various operational stages thereof. Beginning with FIG. 3A, depicted is a first freewheeling stage as denoted between time period $t_0$–$t_1$ of FIG. 2. During this time interval, with the first and third switches S1, S3 turned on, the current through the primary winding Np of the transformer 120 freewheels through the first and third switches S1, S3 and the current through the second secondary winding Ns2 of the transformer 120 freewheels through the first rectifying diode D1. Throughout this stage of operation, the voltage across the isolation transformer 120 is substantially zero and both the primary current and the secondary current are relatively constant.

Figure 3B:
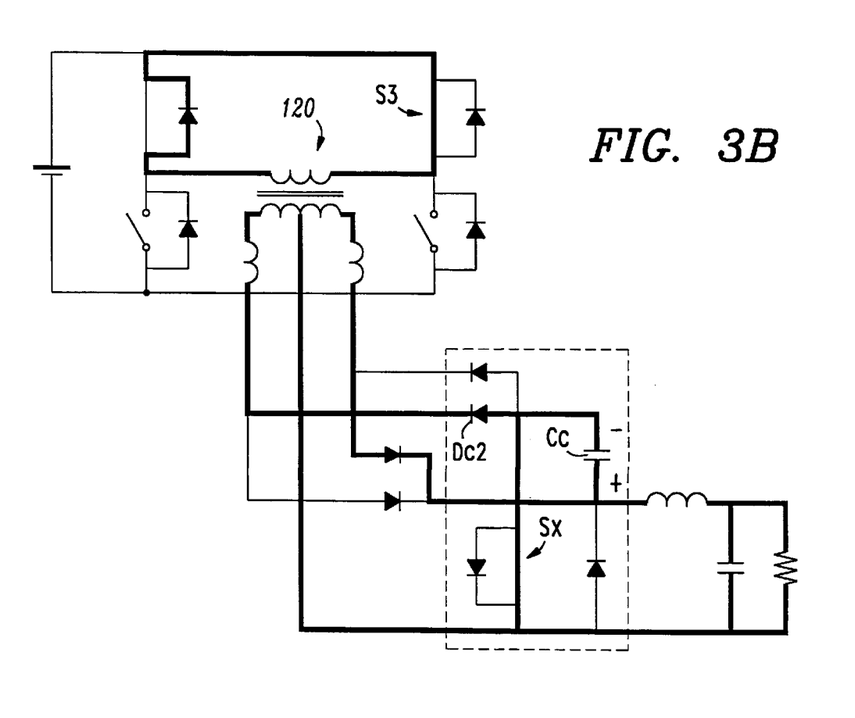
Figure 3C:
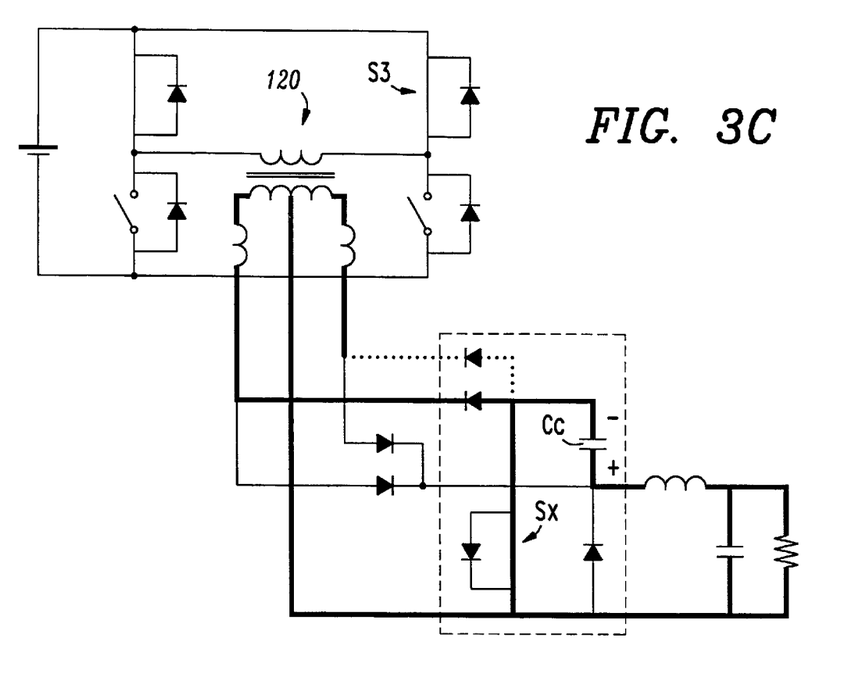
Figure 3D:
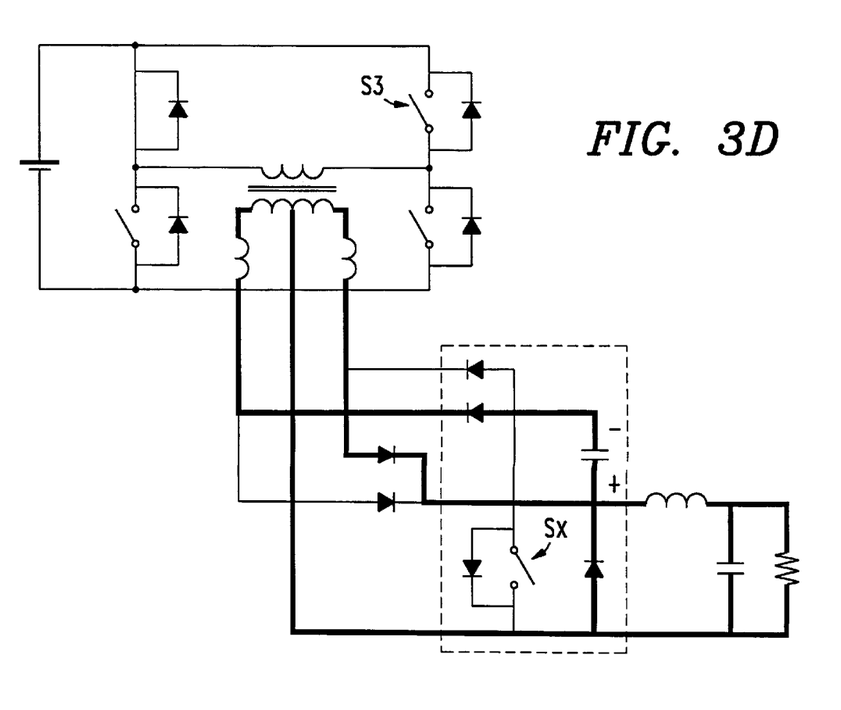

FIGS. 3B–3D depict a discharge stage as denoted between time period $t_1$–$t_3$ of FIG. 2. In FIG. 3B, the auxiliary switch Sx is turned on before the third switch S3 is turned off thereby connecting the clamping capacitor Cc to the transformer 120 through the second clamping diode Dc2. FIG. 3C shows conditions just prior to the turn-off of the third switch S3. By means of the auxiliary switch Sx, the leakage inductance of the transformer 120 is discharged by the clamping capacitor Cc and the primary current and secondary current are reduced to substantially zero. Further, the energy in the clamping capacitor Cc is also transferred to the output. In FIG. 3D, the third switch S3 is turned off with substantially zero current at time $t_2$. The current in the auxiliary switch Sx depends on the load coupled to the converter 100 and may be rather large.

Figure 3E:
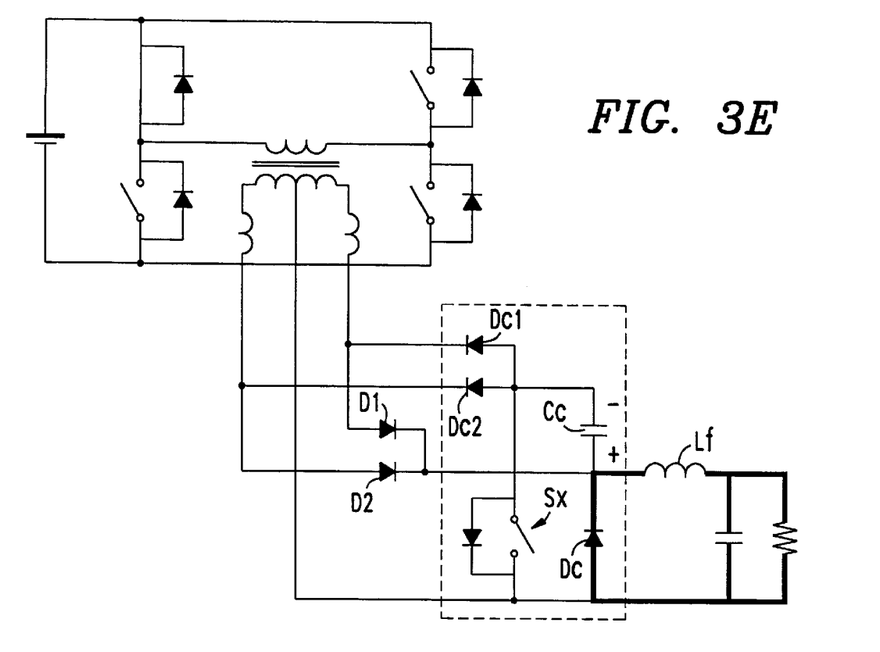

FIG. 3E depicts a second freewheeling stage as denoted by time period $t_3$–$t_4$ of FIG. 2. After the auxiliary switch Sx is turned off at $t_3$, an output current freewheels through the freewheeling diode Dc. During this stage, the reverse recovery current of the diodes D1, D2 (which is significantly reduced as primary current is reduced to substantially zero) flows through clamping diodes Dc1, Dc2 after the diodes D1, D2 are turned off. The clamping capacitor Cc absorbs the reverse recovery energy from the diodes D1, D2 and additionally clamps their voltage, thereby reducing the voltage ringing.

Figure 3F:
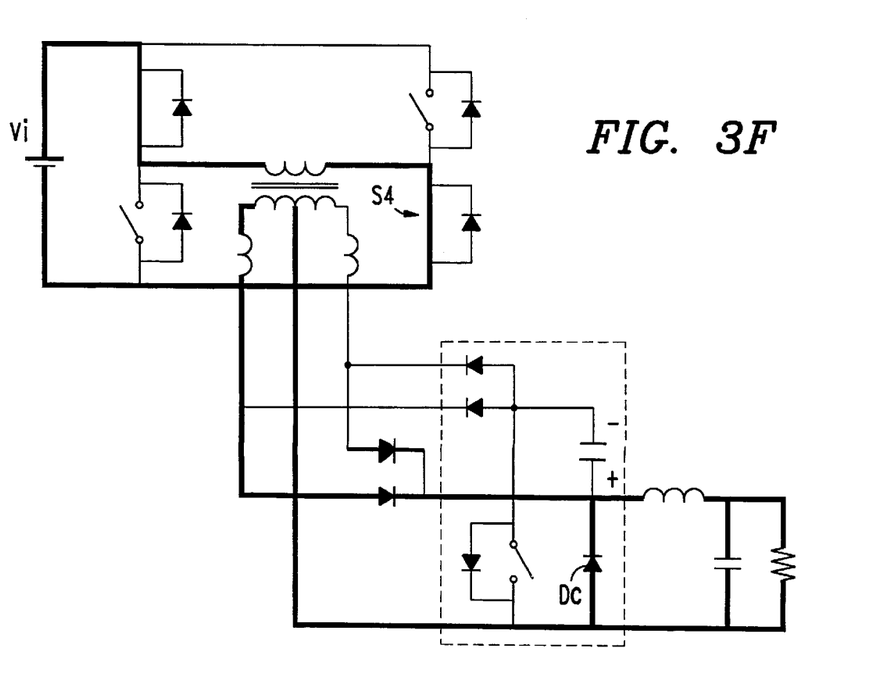
Figure 3G:
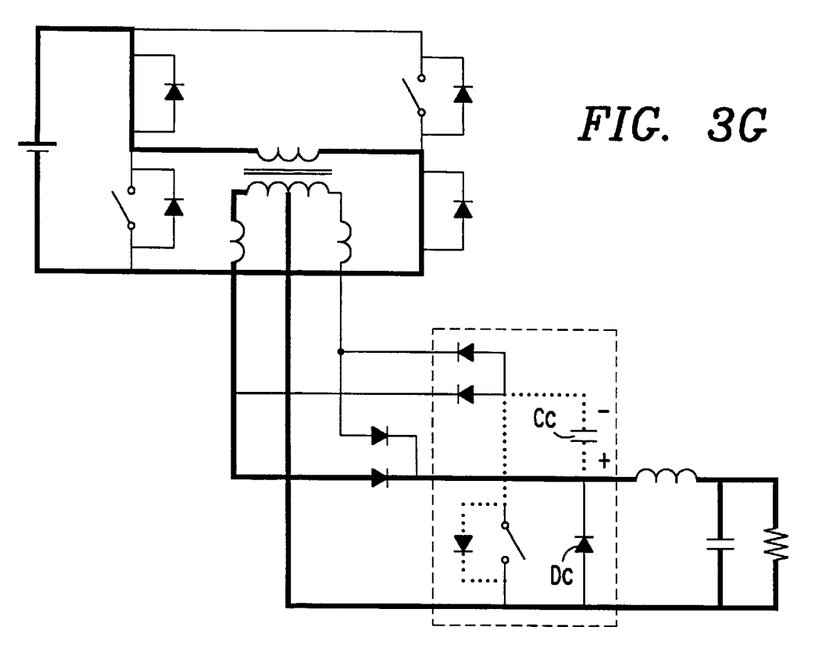

FIGS. 3F–3G depict current paths during a resonant leg switch turn-on stage as denoted by time period $t_4$–$t_5$ of FIG. 2. In FIG. 3F, the fourth switch S4 is turned on under a substantially zero current condition. As the isolation transformer leakage inductance is charged by the source of electrical power Vi, the transformer primary current increases in magnitude and the current in the freewheeling diode Dc is gradually reduced. In FIG. 3G, the freewheeling diode Dc is turned off with reduced reverse recovery current as its current is reduced to substantially zero. The reverse recovery energy will be transferred to the clamping capacitor Cc through the anti-parallel diode of the auxiliary switch Sx, which also clamps the freewheeling diode Dc reverse voltage without excessive ringing.

Figure 4:
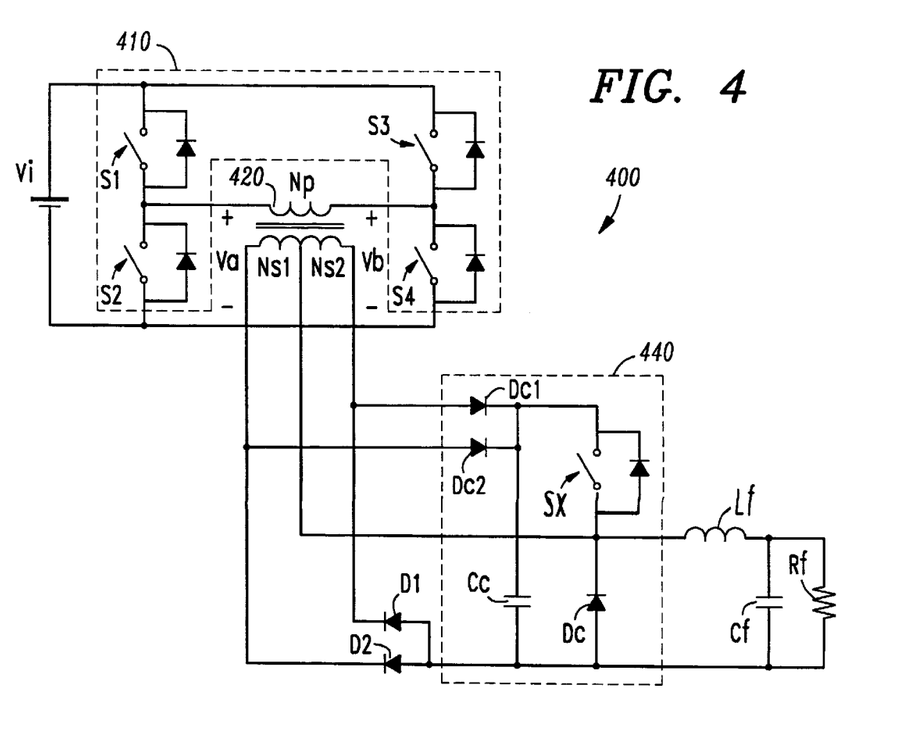
FIG. 4 illustrates a schematic diagram of an embodiment of a power converter constructed according to the principles of the present invention.

Turning now to FIG. 4, illustrated is a schematic diagram of a power converter (e.g., a full-bridge converter) 400 employing another embodiment of an active snubber circuit 440 constructed according to the principles of the present invention which operates analogously to the converter 100 of FIG. 1. The converter 400 is coupled to a source of electrical power Vi and includes an isolation transformer 420 having a primary winding Np and first and second secondary windings Ns1, Ns2. The converter 400 further includes switching circuitry 410, consisting of a first, second, third and fourth switch S1, S2, S3, S4, coupling the source of electrical power Vi to the primary winding Np of the isolation transformer 420. Any type of switching device may be employed in the switching circuitry.

The converter 400 further includes a rectifier (e.g., first and second rectifying diodes D1, D2) coupled to the outer taps of the secondary winding Ns1, Ns2 and to an output inductor Lf. The DC output of the converter 400 is derived from the output inductor Lf and the center tap of the secondary windings Ns1, Ns2. An output capacitor Cf (part of an output filter circuit) and a resistive load Rf are coupled in parallel across an output of the converter 400.

The active snubber circuit 440 includes first and second clamping diodes Dc1, Dc2 which are coupled to the outer taps of the secondary windings Ns1, Ns2 and to an auxiliary switch Sx which is further coupled to the center tap of the secondary windings Ns1, Ns2. A clamping capacitor Cc is coupled between the clamping diodes Dc1, Dc2 and the rectifying diodes D1, D2. Additionally freewheeling diode Dc is coupled to the center tap of the transformer's secondary windings Ns1, Ns2 and to the rectifying diodes D1, D2.

Exemplary embodiments of the present invention have been illustrated above with reference to specific electronic and magnetic components. Those skilled in the art are aware, however, that components may be substituted (not necessarily with components of the same type) to create desired conditions or accomplish desired results. For instance, multiple components may be substituted for a single component and vice-versa.

Additionally, the principles of the invention are equally applicable to converters having different topologies (including different secondary circuits as illustrated in the previous FIGUREs). For instance, although a phase-shifted full-bridge converter is illustrated above, other converters such as PWM full-bridge converters and half-bridge converters are well within the broad scope of the present invention.

Although the present invention has been described in detail, those skilled in the art should understand that they can make various changes, substitutions and alterations herein without departing from the spirit and scope of the invention in its broadest form.

What is claimed is:

1. For use with a power converter having a switching circuit coupled to a primary winding of a transformer and a rectifier coupled to a secondary winding of said transformer, a snubber circuit, comprising:

a clamping capacitor coupled to said secondary winding;

a first clamping diode coupled to said rectifier that diverts reverse recovery currents to said clamping capacitor; and an auxiliary switch that creates a path to discharge leakage inductance in said transformer to facilitate substantially zero current turn-off of said switching circuit and recover energy stored in said clamping capacitor to an output of said converter.

2. The circuit as recited in claim 1 wherein said rectifier comprises first and second rectifying diodes and said snubber circuit further comprises a second clamping diode, said first and second clamping diodes diverting said reverse recovery currents from said first and second rectifying diodes, respectively, to said clamping capacitor.

3. The circuit as recited in claim 1 wherein said rectifier comprises first and second rectifying diodes and said secondary winding includes first and second outer taps and a center tap, said first and second rectifying diodes are coupled to said first and second outer taps, respectively, and said output of said converter is coupled to said center tap.

4. The circuit as recited in claim 1 further comprising a freewheeling diode coupled to said clamping capacitor that provides an alternate current path for an output current of said converter.

5. The circuit as recited in claim 1 wherein said switching circuit comprises controllable first, second, third and fourth switches to impress forward currents across said primary winding.

6. The circuit as recited in claim 1 further comprising an anti-parallel diode coupled to said auxiliary switch.

7. The circuit as recited in claim 1 wherein said converter further comprises an output filter circuit.

8. For use with a power converter having a switching circuit coupled to a primary winding of a transformer and a rectifier coupled to a secondary winding of said transformer, a method of reducing switching losses and reverse recovery currents in said converter, comprising the steps of:

coupling a clamping capacitor to said secondary winding;

diverting said reverse recovery currents to said clamping capacitor through a first clamping diode; and creating a path with an auxiliary switch to discharge leakage inductance in said transformer to facilitate substantially zero current turn-off of said switching circuit and recover energy stored in said clamping capacitor to an output of said converter.

9. The method as recited in claim 8 wherein said rectifier comprises first and second rectifying diodes, the method further comprising the steps of:

diverting said reverse recovery currents from said first rectifying diode to said clamping capacitor through said first clamping diode; and diverting said reverse recovery currents from said second rectifying diode to said clamping capacitor through a second clamping diode.

10. The method as recited in claim 8 wherein said rectifier comprises first and second rectifying diodes and said secondary winding includes first and second outer taps and a center tap, said first and second rectifying diodes are coupled to said first and second outer taps, respectively, and said output of said converter is coupled to said center tap.

11. The method as recited in claim 8 further comprising the step of providing an alternate current path for an output current of said converter through a freewheeling diode.

12. The method as recited in claim 8 wherein said switching circuit comprises controllable first, second, third and fourth switches to impress forward currents across said primary winding.

13. The method as recited in claim 8 wherein said auxiliary switch is coupled to an anti-parallel diode.

14. The method as recited in claim 8 wherein said converter further comprises an output filter circuit.

15. A power converter, comprising:

a transformer having a primary and secondary winding;

switching circuit coupled to said primary winding;

first and second rectifying diodes coupled to said secondary winding; and a snubber circuit, comprising:
- a clamping capacitor coupled to said secondary winding;
- a first clamping diode that diverts reverse recovery currents away from said first rectifying diode to said clamping capacitor;
- a second clamping diode that diverts reverse recovery currents away from said second rectifying diode to said clamping capacitor; and
- an auxiliary switch that creates a path to discharge leakage inductance in said transformer to facilitate substantially zero current turn-off of said switching circuit and recover said energy stored in said clamping capacitor to an output of said converter.

16. The converter as recited in claim 15 wherein secondary winding includes first and second outer taps and a center tap, said first and second rectifying diodes are coupled to said first and second outer taps, respectively, and said output of said converter is coupled to said center tap.

17. The converter as recited in claim 15 further comprising a freewheeling diode coupled to said clamping capacitor that provides an alternate current path for an output current of said converter.

18. The converter as recited in claim 15 wherein said switching circuit comprises controllable first, second, third and fourth switches to impress forward currents across said primary winding.

19. The converter as recited in claim 15 wherein said snubber circuit further comprises an anti-parallel diode coupled to said auxiliary switch.

20. The converter as recited in claim 15 wherein said converter further comprises an output filter circuit.

* * * * *